United States Patent [19]
Dawson

[11] 3,751,283
[45] Aug. 7, 1973

[54] ARMORED METAL TOOLS AND PRODUCTION THEREOF

[75] Inventor: Chester H. Dawson, Danbury, Conn.

[73] Assignee: Remington Arms Company, Inc., Bridgeport, Conn.

[22] Filed: Mar. 8, 1971

[21] Appl. No.: 122,213

Related U.S. Application Data

[62] Division of Ser. No. 813,426, April 4, 1969, abandoned.

[52] U.S. Cl.............. 117/22, 51/293, 51/295, 51/309, 117/19, 117/27, 117/119.6, 117/93.2
[51] Int. Cl.............................. C23c 3/00
[58] Field of Search............. 51/293, 295, 309; 117/22, 19, 27, 119.6, 93.2

[56] References Cited
UNITED STATES PATENTS

| | | | |
|---|---|---|---|
| 2,906,612 | 9/1959 | Anthony et al. | 51/309 |
| 2,292,991 | 8/1942 | Crompton | 51/309 |
| 3,248,189 | 4/1966 | Harris | 51/295 |
| 2,339,208 | 1/1944 | Van der Pyl | 51/309 |

Primary Examiner—William D. Martin
Assistant Examiner—Bernard D. Pianalto
Attorney—Ward, McElhannon, Brooks & Fitzpatrick

[57] ABSTRACT

Armored tools and production thereof comprising a structural base member composed of a base metal, having at least a surface portion embodying a tough, wear-resistant and abrasive, armoring coating produced in situ from abrasive particles of hard, high melting material selected from the group consisting of metal carbides, borides, nitrides, silicides and mixtures thereof, individually precoated with a fluxing agent and with particles of a lower melting brazing metal, said brazing metal particles precoated on said abrasive particles, respectively, being fusion bonded to each other to their respective abrasive particles and to said base metal thereat in weldments individual to said abrasive particles, and partially embedding and anchoring said abrasive particles therein, respectively, with said abrasive particles projecting beyond said embedding matrix metal weldments to form a multiplicity of sharp cutting edges.

Figure 3:
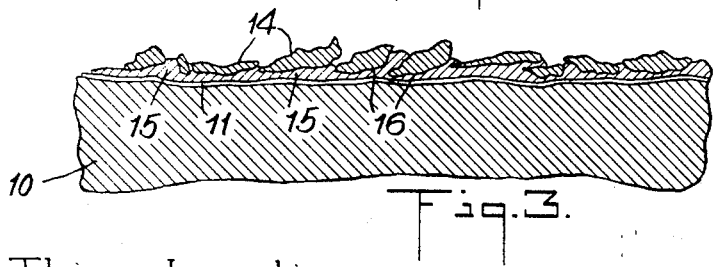

1 Claim, 7 Drawing Figures 3,751,283

SHEET 1 OF 2

This Invention

ARMORED METAL TOOLS AND PRODUCTION THEREOF

This application is a division of application Ser. No. 813,426, filed Apr. 4, 1969 (now abandoned), which is a continuation-in-part of applications Ser. No. 704,170, filed Feb. 8, 1968 (now U.S. Pat. No. 3,615,309) and Ser. No. 638,998, filed May 16, 1967 (now U.S. Pat. No. 3,449,146), which latter in turn is a continuation-in-part of application Ser. No. 177,558, filed Mar. 5, 1962 (now abandoned), which in turn is a continuation-in-part of application Ser. No. 546,779, filed Nov. 14, 1955 (now U.S. Pat. No. 3,024,128), which in turn is a continuation-in-part of application Ser. No. 548,915, filed Nov. 25, 1955 (now U.S. Pat. No. 3,023,490), which in turn is a continuation-in-part of application Ser. No. 367,543, filed July 13, 1953 (now abandoned), which in turn is a continuation-in-part of application Ser. No. 41,180, filed July 28, 1948 (now abandoned).

This invention pertains to armored tools and the production thereof, comprising a structural base member composed of a base metal, such as steel, alloy steel or other metal or alloy characterized inherently by high strength, hardness and toughness or heat treatable to such, said structural base member having a hard wearing, ductile and abrasive surface coating produced in situ from powdered metal particles consisting preferably of a hard, refractory, brazing or matrix metal or metal alloy, such as a nickel-base or cobalt-base alloy, and abrasive particles of a hard, high melting material, such as metal carbides, borides, nitrides, silicides, or equivalent diamond substitute materials, said matrix metal particles being fusion bonded to each other, to said abrasive particles and to said base metal, and said abrasive particles being partially embedded or anchored in said matrix metal and projecting therefrom to provide a multiplicity of sharp cutting edges.

The invention pertains more particularly to armored tools of novel construction and performance as compared to those previously known, and to novel methods of producing the same as will appear from the following description.

A conventional method of preparing armored tools is to apply to a surface portion of a structural base member to be armored, a thin layer of an adhesive paste flux, then a layer of the matrix or brazing metal powders, and finally a layer of the abrasive metal particles. The tool or at least the so-coated portion thereof is then heated to temperature sufficiently high to fuse the brazing metal powders into a layer of molten brazing metal which is then cooled and solidified permanently to bond the brazing metal layer to the tool base metal and to the abrasive particles and to permanently embed and anchor the abrasive particles in the brazing metal. In accordance with a known modification of this technique, the paste flux and brazing metal powders may be premixed and applied in a thin layer to the base metal substrate to which is then applied an overcoating layer of the abrasive particles, the subsequent processing being the same as that above.

In both of the foregoing methods, the finished braze metal coating completely covers the armored surface of the substrate base metal in varying degrees of thickness, depending on the amount of braze metal originally applied. For some applications, particularly in those where a relatively sparse coating of the abrasive metal particles is desired, this can be a disadvantage. If a flexible substrate is required, as in the production of armored band saws and the like, the layer of braze metal can reduce the flexibility and also adversely affect the fatigue life, since the physical properties of the brazing metal are not necessarily compatible with that of the substrate. Moreover, the excess of braze metal which is not actually employed for anchoring the abrasive particles also increases the cost of materials employed. In addition, the technique of applying the flux, brazing metal powders and abrasive particles in two or three layers as above described is not always suitable for the tool to be armored and also can result in increased labor costs.

The present invention eliminates these objectionable features of known armoring techniques by individually precoating the abrasive particles with a fluxing agent, such as borax, and with the brazing metal powders, and applying the so-coated particles in a single layer to the base metal substrate. A sufficient amount of the brazing metal powders is precoated onto each grit particle as upon subsequent fusion and solidification of the brazing metal to anchor the grit particles therein and bond the brazing metal to the substrate metal in the manner hereinafter explained. For adhering the coated grit particles to the substrate metal pending fusion bonding of the matrix metal, the substrate metal surface may be initially printed with a suitable adhesive, such as printers ink or other adhesive as described below.

This method of armoring has the following outstanding advantages as compared to conventional techniques. Each grit particle has its own flux agent and supply of brazing metal. The total amount of brazing metal is reduced. The brazing metal wets and bonds only to the grit particle onto which it is coated and only to a small area of the substrate metal. The grit particles may be applied to the substrate as closely or sparsely spaced as desired, depending on the tool requirements. Thus, for tools requiring a flexible substrate of optimum fatigue properties, such as band saws, file bands and sanding discs, a sparse spacing of the grit particles is required. Also, with the process of the instant invention, the number of operations in the coating sequence is reduced and simplified.

Broadly stated, the method of the invention for precoating the abrasive particles consists in admixing the same with the brazing metal powders and with a water-soluble fluxing agent, such as borax, in a sufficient amount of water to dissolve the fluxing agent. The water is then boiled off until a thick slurry is obtained wherein the fluxing agent has precipitated and deposited as an adherent coating on the abrasive metal particles along with particles of the brazing metal. The slurry is then dried, crushed and screened to a particle size passing substantially only individually so-coated abrasive particles. Larger particles retained on the screen are recrushed and rescreened to said particle size. For most armoring applications, the brazing metal powders are of a substantially smaller grain size than the abrasive metal particles. Hence the screening to pass the coated abrasive metal particles will also pass any non-adhering brazing metal particles. These are screened out by a second screening to a mesh size to pass the same while retaining the coated abrasive particles, which latter are employed for the armoring coating.

A preferred method of precoating the abrasive particles is the following wherein tungsten carbide grits of 30-40 mesh and 70-100 mesh are employed as the abrasive material.

EXAMPLE

Step 1 — If relatively coarse (30-40) tungsten carbide grits are used, mix the following proportions in a suitable container:
 1 lb. tungsten carbide grits
 1.4 oz. Oxweld Brazo Flux (essentially borax)
 4 oz. 300—mesh braze alloy granules
 50 ml. water Step 1a — If relatively fine (70-100) tungsten carbide grits are used, mix the following proportions in a suitable container:
 1 lb. tungsten carbide grits
 1.4 oz. Oxweld Brazo Flux (borax)
 4 oz. 300—mesh braze alloy granules
 65 ml. water Step 2 — Boil off the water until a thick slurry is formed, stirring continuously to keep the solids from sticking to the bottom and sides of the container.

Step 3 — Spread the slurry into a thin sheetlike form, for example, having a thickness of about 3/16 inch.

Step 4 — Slice the slurry into small squares and allow to dry to a solid cake.

Step 5 — Break up and crush the dry cake with suitable hand trowel taking care not to crush excessively.

Step 6 — Screen the crushed cake through a sieve of adequate mesh size to pass single tungsten carbide grits coated with brazing alloy, but not to pass two or more tungsten carbide grits stuck together. The larger crushed dry cake particles retained on the sieve are recrushed and rescreened. This procedure is repeated until all of the dry cake particles are crushed adequately to pass through the sieve.

Step 7 — Any excessive braze alloy granules which do not adhere to the tungsten carbide grits are screened out on a sieve size substantially smaller than the coated tungsten carbide grits.

The adherence of the brazing alloy granules to the tungsten carbide grits may be improved by gently hand mixing shellac with the small dried cake squares following Step 4.

Use 12 ml. of shellac for each pound of coarse (30-40) tungsten carbide grits in the original mixture.

Use 15 ml. of shellac for each pound of fine (70-100) tungsten carbide grits in the original mixture.

After the shellac dries, the remaining procedure is the same as Steps 5 through 7.

Other suitable resins may be employed for the purpose, such as pine oil.

The "Oxweld Brazo Flux" above referred to is a product of the Linde Division of the Union Carbide Corporation. It consists of a borax mixture containing boric acid and is essentially commercial borax.

A preferred method according to the invention for applying the armoring coating to the tool substrate is as follows. A thin adhesive coating is applied to the surface portion or portions of the substrate to be armored, preferably by a printing operation, employing printers ink or other adhesive as the coating material, as described below. Before this coating becomes dry, the so-printed surface of the substrate is passed preferably beneath a falling curtain of the precoated abrasive particles at a rate of application adjusted to provide a preselected average spacing between the particles falling upon and adhering to the printed surface portions, non-adhering particles being removed thence by an air blast. In this way, the precoated abrasive particles may be applied to the printed surface portions in as dense or sparse a distribution as desired, depending on the character of the substrate being armored.

Figure 1:
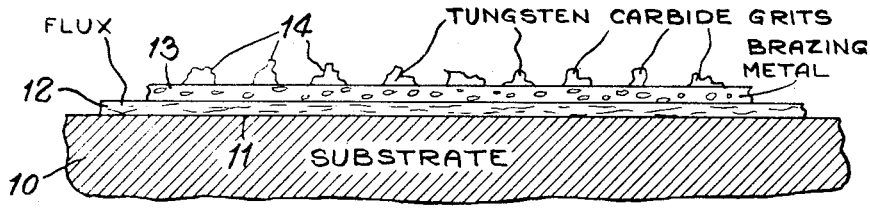
Figure 2:
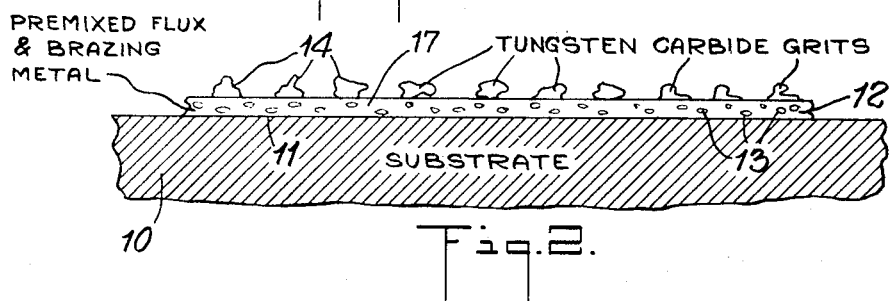

The coating thus applied to the tool substrate is allowed to dry in ambient air or the tool is passed through a drying unit until the adhesive coating is dried by removal of moisture therefrom. The tool is thence passed through an induction heating coil energized from a high frequency alternating current source for rapidly heating the same to temperature sufficiently high to melt the brazing metal powders coating each grit particle whereby the molten matrix metal flows about the base of each grit particle and onto the base metal substrate and by capillary action coalesces into a cup-like molten pool partially immersing the grit particle therein, with said particle prejecting therefrom. The extent of this immersion is determined by the amount of brazing metal particles precoated onto the surface of each grit particle which is proportioned in accordance with one embodiment of the invention to provide only partial immersion of the grit particles therein. The extent of immersion of the grit particles is also controlled by the product of time and termperature occurring during brazing. Too high a temperature for too long a time can produce total immersion of the grit particles, while too low a temperature for too short a time can produce an insufficient and brittle fillet. The tool is next subjected to rapid cooling in an inert atmosphere until cooled to temperature such that the molten cup of brazing metal surrounding the base of each grit solidifies and thus permanently anchors the grit base therein in bonded relation to the grit particle and to substrate base metal. If, as is usually the case, the tool base metal is a heat treatable steel or alloy steel, this heating and cooling may also be such as to austenitize and thence transform to martensite the microstructure of the steel substrate which is thereafter subjected to a tempering treatment as described below. An alternative albeit less desirable procedure is to perform only the brazing operation in the induction heating coil, followed by an air cool and thence in a separate heating unit, heating the tool to an austenitizing temperature, followed by quench and temper treatments In the accompanying drawings:

FIGS. 1-3, incl., illustrate the prior art practices of armoring a substrate base metal. FIG. 1 is a view in sectional elevation of a substrate, successively coated on its upper surface with a layer of flux, thence with a layer of matrix metal powders and thence with a layer of tungsten carbide grits. FIG. 2 is a similar view of a substrate coated first with a layer of premixed flux and brazing metal powders and thence with a layer of tungsten carbide grits. FIG. 3 is a similar view of either the FIGS. 1 or 2 embodiments after fusion bonding of the matrix metal to the substrate and to the tungsten carbide grits.

Figure 4:
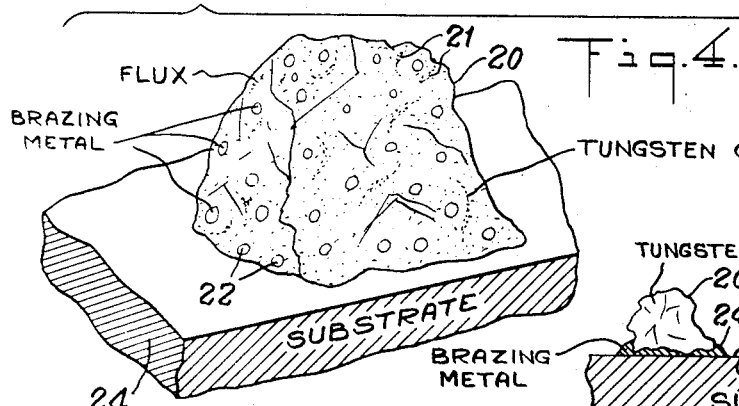
Figure 6:
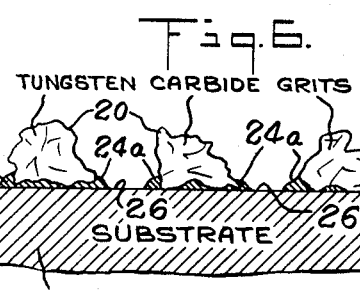
Figure 5:
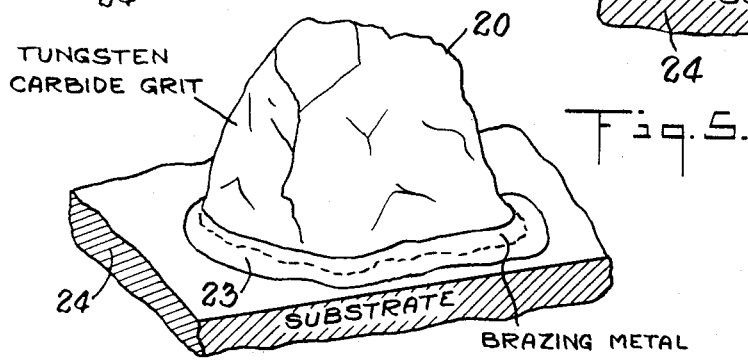
Figure 2:
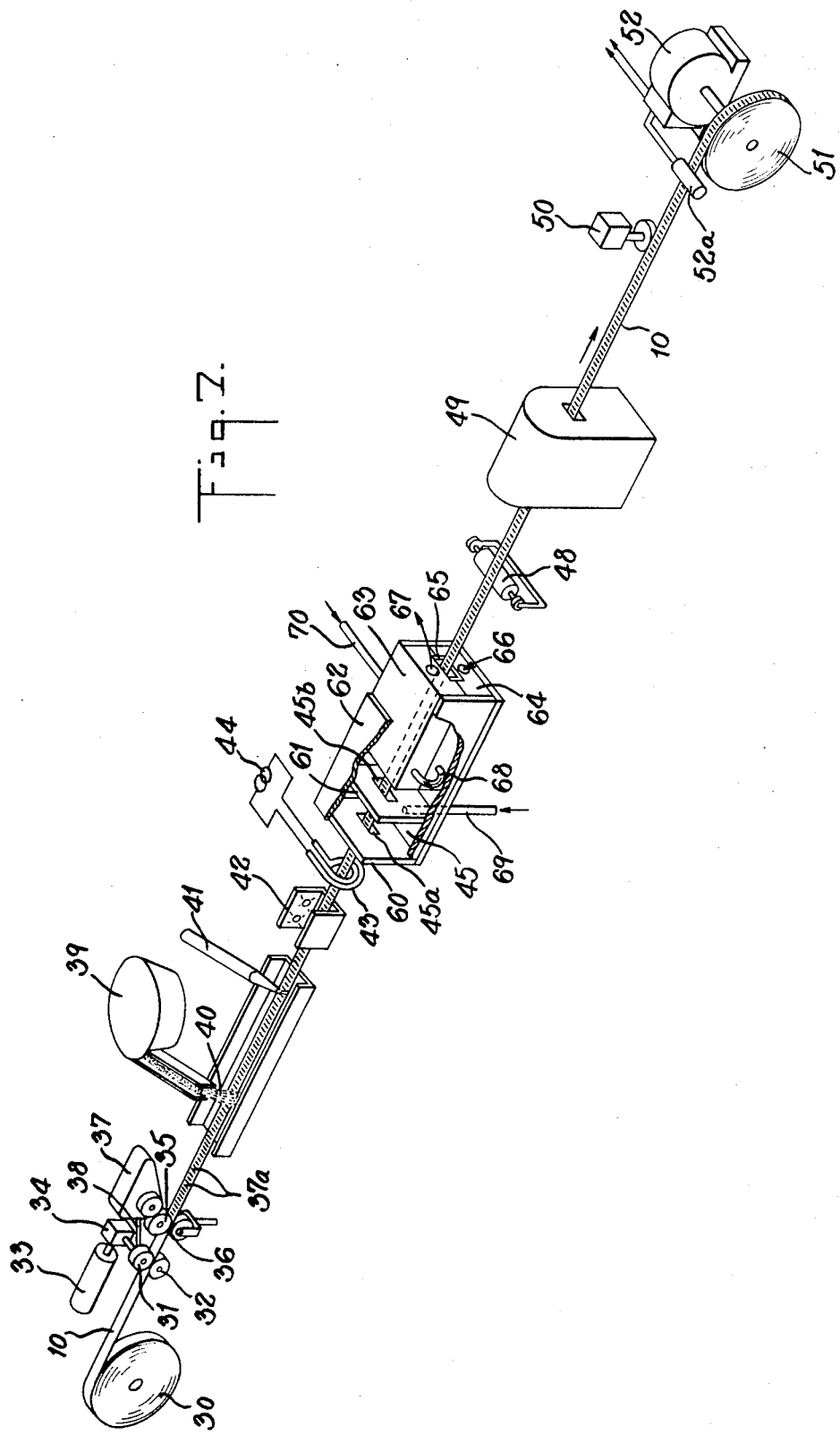

FIGS. 4-6, incl., illustrate armoring of a substrate base metal in accordance with the practice of this invention. FIG. 4 illustrates in enlarged perspective view one of the tungsten carbide grits as precoated with a flux and brazing metal powders as disposed on the substrate base metal prior to fusion bonding of the matrix metal, while FIG. 5 is a similar view subsequent to the fusion bonding. FIG. 6 is a view in sectional elevation of a substrate base metal having a series of tungsten carbide grits bonded thereto through weldments of the matrix metal individual thereto.

FIG. 7 is a diagrammatic showing in flow sheet form illustrative of a practical application of the invention to the production of armored flexible-file band strip stock for use in filing applications on band saw machines.

FIGS. 1 and 3 illustrate the prior art method above discussed for applying an armoring coating to a substrate base metal 10 wherein there is first applied to a surface 11 thereof a layer of a flux adhesive 12, to which is next applied a layer of brazing metal powders 13, and onto which is deposited a layer of tungsten carbide grits 14. The so-coated substrate is thence heated to temperature sufficiently high to fuse the brazing metal powders and cooled thence to temperature sufficiently low to solidify the brazing metal into a continuous layer as at 15, FIG. 3, which is permanently bonded to the substrate 10 and in which the carbide grits 14 are permanently anchored, as at 16. In FIG. 2, the flux 12 and brazing metal powders 13 are premixed and applied to the substrate in a single layer 17, on which is deposited a layer of the carbide grits 14. On fusion and subsequent solidification of the matrix metal, the armored coating produced is the same as in FIG. 3. The disadvantage of both these methods of armoring and also as to the armored products thus obtained are as above discussed and hence require no further comments.

Referring now to the practice of the present invention as illustrated in FIGS. 4-6, incl., FIG. 4 shows a carbide grit 20, precoated with a flux, such as borax, as at 21, and with the matrix metal powders, as at 22, disposed on a substrate base metal member 24. On heating the assembly to temperature sufficient to fuse the matrix metal powders, the fused globules thereof will flow about the base of the carbide particle 20 and against the substrate 24 to form a continuous band of fused metal, as at 23, FIG. 5, which by capillary action rises up about the base of the carbide particle into cup-like configuration, as at 24a, FIG. 6, such that upon subsequent cooling and solidification of the matrix metal, the carbide particles 20 are individually anchored in their respective weldments 24 a of matrix metal which are in turn permanently bonded to and alloyed with the base metal substrate 24.

Comparing the armored coating of FIG. 6 with that of FIG. 3, it will be seen that the two are structurally entirely different, this resulting from their different modes of production. As a result of applying the brazing powders and carbide grits in successive layers as in FIGS. 1 and 2, the armored substrate 10 of FIG. 3 becomes coated throughout with a fused layer of the brazing metal, as at 15, and this irrespective of whether the carbide grits are densely or sparsely deposited on the layer of brazing metal, FIG. 1, or brazing metal plus flux, FIG. 2. In contrast in the armoring method of FIGS. 3-6, incl., according to this invention, wherein each carbide grit is precoated with its own supply of brazing metal in controlled amount, the brazing metal for each grit wets only a small area of the substrate surrounding the grit, as at 23, FIG. 5, these areas in general being separate and distinct for the various grits as at 24a, FIG. 6, with exposed substrate areas therebetween, as at 26, FIG. 6. The spacings 26 between the grits and their brazing metal weldments 24a will, of course, vary with the spacings between the coated grits as deposited on the substrate, which, of course, may be varied as desired and in a manner hereinafter explained with reference to FIG. 7. The advantages of the armored construction of FIG. 6 as compared to that of FIG. 3 have been explained above.

Referring now to FIG. 7 wherein the process of the invention is employed for producing armored file band strip stock, a coil of, for example, AISI 6150 alloy steel strip 0.025 inch thick by 1 inch wide, shown at 10, is mounted on an unwind reel 30. By way of example, this coil may contain approximately 1,000 feet of strip. A frictional drag mechanism of conventional construction (not shown) restrains the unwind reel from turning prematurely in response to the spring energy contained in the wound-up steel strip 10. The strip passes thence between a pair of rubber-covered rolls 31, 32, which frictionally engage the strip and the upper roll of which is driven in order to move the strip forward against the resistance of the frictional drag mechanism. Thus, the upper roll 31 is driven by a variable speed electric motor 33 and geared head speed reducer 34, while the lower roll 32 functions as an idling back-up roll.

The strip 10 then passes thence between a pair of rolls 35, 36 of an industrial roll type printing machine, shown generally at 37. This machine prints a desired pattern such as a series of longitudinally spaced rectangles, as at 37a, on the top side of the strip 10 using a viscous coating medium, as hereinafter described. The printing machine is driven via a chain drive 38 by the same motor and speed reducer 33, 34 that powers the drive wheel 31 so that the printing speed and strip speed are synchronized. While the printing pattern is still wet, the strip 10 passes under a vibratory feed hopper 39, electromagnetically actuated in conventional fashion. This hopper feeds onto the upper surface of the strip 10 a thin layer, as at 40, of tungsten carbide or other abrasive particles precoated with flux and brazing metal powders, as above described. The density or sparseness with which these particles are deposited on the strip 10 is controlled by the vibratory adjustment of the feed hopper and by the speed at which the strip is fed. The strip 10 bearing the thus precoated tungsten carbide particles travels next past an air blower 41. This blower removes the abrasive particles from all areas of the band other than those which stick to the printed pattern. Depending on such factors as strip speed or spacing between the feed hopper and the air blower, it may be necessary in some instances to include a dryer between the hopper and the air blower. Alternatively, such a dryer, for example as an infra-red ray drying unit, may be disposed as at 42, following passage of the strip past the air blower 41.

The strip with the abrasively coated pattern passes next through a high frequency induction coil 43 energized from a high frequency current source 44, as for example of about 5.2 megacycles per second. This coil heats the strip to approximately 1,900° F. to austenitize the steel of the substrate strip and to braze the tungsten carbide grits to the strip by causing the steel band to be inductively heated, this heat then by induction and radiation causing the matrix metal particles coating each carbide particle to melt and flow to and about the base of each grit in the manner above described with reference to FIGS. 4-6, incl.

The strip 10 passes next into and out of an atmosphere chamber 45, thorugh slots as 45a, 45b, formed in end and partitioning walls 60, 61, comprising part of a substantially rectangular housing 62. The strip passes thence within the housing through a slotted chill block consisting of a pair of upper and lower metal blocks 63, 64, forming a slot between them as at 65, these blocks being cooled by water flow through passages as at 66, 67 therein and a pipe connection between the blocks as at 68.

The atmosphere chamber 45 has injected therein through a pipeline 69 a flow of nitrogen gas part of which flows out through the slot 45a in the end wall 60 and through and about the induction coil 43. The balance of the nitrogen gas flows through the slot 45b in the partitioning wall 61, thence through the slot 65 formed between the chill blocks.

As the strip 10 passes out of the magnetic field of the induction coil and into the atmosphere chamber 45, the matrix metal coating each grit cools and solidifies thereby permanently to anchor the grits in matrix metal weldments individual thereto and to bond these weldments to the base metal substrate as in FIG. 6. The chill blocks 63, 64 further cool the heated strip 10 quickly to temperature below that of martensitic transformation of the steel substrate, thus to quench harden the same. The chill blocks are not required where the strip stock is made of a steel which hardens on air cooling from the austenitic state.

The circulating flow of nitrogen gas injected into chamber 45 through pipeline 69 serves to minimize scaling or oxidation of the steel strip substrate 10 until it is cooled below scaling or oxidizing temperature. The portion of the nitrogen gas which escapes through the slot 45a flows thence through and about the induction coil 43 and thus protects the strip 10 against oxidation and scaling during induction heating. The remainder of the nitrogen gas which escapes through the slot 45b in the partitioning wall 61, and which flows thence through the slot 65 between the chill blocks serves to protect the strip 10 against oxidation and scaling as it cools down to room temperature. This nitrogen gas flow is supplemented by additional nitrogen gas injected into the chill block slot through a pipeline 70.

The strip 10 passes next over an idler support roller 48 and through a tempering oven 49, wherein the strip is tempered at about 950° F. The strip passes next past a counter 50, which continuously records the total length in feet or otherwise of the strip processed. The strip 10 is next engaged by a take-up reel 51 driven by a motor 52. The take-up reel exerts only an intermittent pull on the band. It is intermittently activated by a tension arm 52a resting on the strip 10, and applies tension when needed for coiling but avoids excessive pull which could stretch the strip at the point where it is red hot and weakly plastic in the induction heating coil.

The adhesive coating printed onto the strip by the printer 37 may be conventional printers ink minus the coloring matter, compositions for which are described in standard texts, such as "Chemical and Metallurgical Engineering" 47.544 (1940), Kingzett's "Chemical Encyclopaedia," 1940 Ed., page 520, and Shreves' "Chemical Process Industries," 1945 Ed., page 509. As stated in these publications, printing ink consists essentially of a suspension of pigments, such as paint pigments, in a drying oil, such as linseed oil or petroleum oils, to which may be added various natural or synthetic resins, waxes, gums, water-insoluble soaps, driers, antioxidants, bitumen, asphalt or stearine pitch, etc.

In addition to the conventional printing inks, applicant has found the following adhesive printing admixtures to be suitable for purposes of this invention.

EXAMPLE I

Admix 7-½ oz. "Nicrobraz" Flux, 80 milliliters corn syrup, 10 milliliters Lube Well D-100, water-soluble oil used as an emulsifier and to promote wetting, 20 milliliters ethylene glycol to slow up drying action, and 25 milliliters water. This mixture is suitable for use in a conventional roll type printing unit.

EXAMPLE II

Admix 7 oz. "Nicrobraz" Flux with 80 milliliters glycerin.

The flux is used in the above examples as the solid in suspension to prevent squeegee action during printing which otherwise causes the adhesive to push out around the print pattern thus destroying the precise pattern. The addition of extra solids makes room between the print roll and the surface being printed so that an adequate thickness of adhesive material may be applied. Flux is compatible with the process where many other types of solids for the purpose leave harmful inclusions in the finished product. The "Nicrobraz" Flux referred to in the examples is a boride-fluoride flux put out under that designation by the Wall Colmondy Company, Detroit, Michigan.

As above stated, the preferred material applied to the tool substrate for purposes of armoring comprises tungsten carbide particles precoated with a suitable flux, such as borax, and also with the brazing metal powders. The materials employed for the brazing metal are preferably powders of hard, refractory alloys, such as nickel-base or cobalt-base alloys, capable of providing a matrix metal which wets the surfaces of and bonds to the tungsten carbide or other diamond substitute particles and also which fusion bonds to and alloys with the steel or alloy steel substrate base metal. Suitable such brazing alloys are "Stellite," a cobalt-chromium tungsten alloy of well-known composition; also that sold by the Wall Colmonoy Company as "LM Nicrabraz" comprising an alloy consisting of 13.5 percent Cr, 3.5 percent B, 4.5 percent Si, 2.5 percent Fe and the balance nickel. A suitable particle size for the brazing metal powders is −300 mesh. Copper and copper-based alloys may also be employed as the brazing metal for certain applications.

A suitable particle size for the carbide particles is that which passes through a 30-mesh screen but is held on a 40-mesh screen. Thus, the particle size of the carbide particles is considerably greater than for the brazing metal powders.

I claim:

1. The method of producing a cutting tool adapted for cutting hard and refractory materials and consisting of a tool substrate made of a hardenable and temperable ferritic steel embodying a strong, adherent, armoring coating having a multiplicity of sharp cutting edges, said method comprising: forming an aqueous slurry of a water soluble fluxing agent together with a major proportion by weight of abrasive, refractory metal carbide particles and a minor proportion by weight of smaller particles of a brazing metal selected from the group consisting of nickel base and cobalt base alloys, concentrating said slurry until said fluxing agent has precipitated and deposited as an adherent film on said abrasive particles together with particles of said brazing metal, drying said slurry and screening to a particle size passing substantially only individual so-coated abrasive particles, imprinting a viscous coating on a surface portion of said substrate, applying to said viscous coating a layer of said screened particles, subjecting the so coated substrate to high frequency induction heating at temperature sufficiently high to austenitize the steel of said substrate and to fuse said brazing metal particles and cause the same to flow and coalesce about the basal portions of said abrasive particles leaving the upper portions of said particles exposed to form sharp cutting edges, and also to cause said brazing metal to flow onto said substrate and alloy therewith, thereupon subjecting the so coated substrate to rapid cooling to solidify the fused brazing metal, thereby permanently to bond said brazing metal to said tool substrate and to said abrasive particles and to anchor said particles therein, and to impart a hard, martensitic structure to said substrate.

* * * * *